United States Patent
Li et al.

(10) Patent No.: US 11,362,621 B2
(45) Date of Patent: Jun. 14, 2022

(54) WIRING DEVICE OF PHOTOVOLTAIC EQUIPMENT

(71) Applicant: SUNGROW POWER SUPPLY CO., LTD., Anhui (CN)

(72) Inventors: Wenhao Li, Anhui (CN); Yonghong Li, Anhui (CN); Qingqing Xu, Anhui (CN); Peng Chen, Hefei (CN); Puyun Dong, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 17/211,543

(22) Filed: Mar. 24, 2021

(65) Prior Publication Data

US 2021/0305934 A1 Sep. 30, 2021

(30) Foreign Application Priority Data

Mar. 26, 2020 (CN) .......................... 202010223551.X

(51) Int. Cl.
*H02S 40/36* (2014.01)
*H01R 13/424* (2006.01)
(Continued)

(52) U.S. Cl.
CPC .............. *H02S 40/36* (2014.12); *H01R 4/62* (2013.01); *H01R 13/02* (2013.01); *H01R 13/03* (2013.01);
(Continued)

(58) Field of Classification Search
CPC .......... H02S 40/36; H02S 40/34; H02S 40/30; H01R 13/424; H01R 13/621; H01R 4/62;
(Continued)

(56) References Cited

U.S. PATENT DOCUMENTS

| 10,630,005 B1* | 4/2020 | Ridley .................... H01R 4/20 |
| 2013/0056268 A1* | 3/2013 | Bumgarner ............ H01R 4/363 |
| | | 174/94 R |
| 2016/0226158 A1* | 8/2016 | Cox ....................... H01R 4/363 |

FOREIGN PATENT DOCUMENTS

| CN | 206194989 U | 5/2017 |
| CN | 206628610 U | 11/2017 |

(Continued)

OTHER PUBLICATIONS

Extended European Search Report regarding Application No. 21163817.6 dated Aug. 20, 2021.

*Primary Examiner* — Travis S Chambers
(74) *Attorney, Agent, or Firm* — Harness, Dickey & Pierce, P.L.C.

(57) ABSTRACT

A wiring device of photovoltaic power generation equipment includes an aluminum wire and a copper-aluminum transition element. One end of the aluminum end is connected with the aluminum end of the copper-aluminum transition piece, and the other end of the aluminum end is configured to connect with an external connecting component. The copper end is configured to connect with photovoltaic power generation equipment. In the wiring device of the photovoltaic power generation equipment provided in the present application, the copper-aluminum transition piece is arranged at the position of the photovoltaic power generation equipment, and the aluminum end of the copper-aluminum transition piece is connected to the external connecting component by the aluminum wire, avoiding using copper wire for long-distance conduction. The cost of the aluminum wire is much lower than that of the copper wire. Therefore, the cost of the wiring device provided by the application is reduced.

17 Claims, 3 Drawing Sheets

(51) Int. Cl.
*H01R 13/621* (2006.01)
*H01R 4/62* (2006.01)
*H01R 13/502* (2006.01)
*H01R 13/02* (2006.01)
*H02S 40/30* (2014.01)
*H02S 40/34* (2014.01)
*H01R 13/03* (2006.01)

(52) U.S. Cl.
CPC ......... *H01R 13/424* (2013.01); *H01R 13/502* (2013.01); *H01R 13/621* (2013.01); *H02S 40/30* (2014.12); *H02S 40/34* (2014.12)

(58) Field of Classification Search
CPC ...... H01R 13/02; H01R 13/03; H01R 13/502; H02G 3/086; H02G 3/088; Y02E 10/50
See application file for complete search history.

(56) References Cited

FOREIGN PATENT DOCUMENTS

| CN | 207753204 U | 8/2018 |
|---|---|---|
| CN | 207818921 U | 9/2018 |
| CN | 108988777 A | 12/2018 |
| CN | 208806387 U | 4/2019 |
| CN | 106410437 B | 6/2019 |
| CN | 209607986 U | 11/2019 |
| JP | 2018069303 A | 5/2018 |
| WO | WO-2019043728 A1 | 3/2019 |

\* cited by examiner

WIRING DEVICE OF PHOTOVOLTAIC EQUIPMENT

CROSS REFERENCE TO RELATED APPLICATIONS

This application claims the priorities to Chinese patent application No. 202010223551.X, titled "WIRING DEVICE OF PHOTOVOLTAIC EQUIPMENT", filed with the China National Intellectual Property Administration on Mar. 26, 2020, the entire disclosure of which is hereby incorporated by reference.

TECHNICAL FIELD

The present application relates to the technical field of photovoltaic power generation, and in particular to a wiring device for photovoltaic equipment.

BACKGROUND

In photovoltaic equipment, connecting copper rows inside photovoltaic power generation equipment are all made of copper. Since copper and aluminum laps are prone to electrochemical corrosion, and such use for a long time may cause heat accumulation and burn the terminals, the panels or other components connected to the photovoltaic power generation equipment are connected to the copper rows of the photovoltaic power generation equipment through a copper wire as a wiring device.

For the external connecting components far away from the photovoltaic power generation equipment, a long distance copper wire is desired. However, due to the high cost of the copper wire, the cost of the wiring device is high.

Therefore, how to reduce the cost of the wiring device is an urgent technical issue to be solved by those skilled in the art.

SUMMARY

A wiring device of photovoltaic equipment is provided by the present application for reducing the cost of the wiring device.

The present application provides a wiring device of photovoltaic equipment, which includes an aluminum wire and a copper-aluminum transition piece, one end of the aluminum wire is connected to an aluminum end of the copper-aluminum transition piece, and the other end of the aluminum wire is configured to connect to an external connecting component, and a cooper end of the cooper-aluminum transition is configured to connect to photovoltaic power generation equipment.

Preferably, the wiring device of photovoltaic equipment further includes a transition box, the copper-aluminum transition piece is a cooper-aluminum transition row, an insulating holder for installing the copper-aluminum transition row is provided in an interior of the transition box, and the housing of the transition box is provided with a copper wire through hole for the passage of the copper wire and an aluminum wire through hole for the passage of the aluminum wire.

Preferably, the copper wire through hole is arranged on a first side surface of the transition box, and the aluminum wire through hole is arranged on a second side surface of the transition box, and the first side surface is opposite to the second side surface. The outer surface of the first side surface is provided with a limiting protrusion capable of abutting against a case and a first sealing strip arranged circumferentially, and the outer protruding length of the limiting protrusion is less than the free-state outer elongation length of the first sealing strip. The wiring device of the photovoltaic equipment has multiple limiting protrusions, and multiple limiting protrusions are arranged along the circumference of the first sealing strip. The copper wire through hole is located in an inner space formed by a circumferential encircle of the first sealing strip, and the first side surface is fixedly connected with the photovoltaic power generation equipment.

Preferably, the first side surface is connected with the case of the photovoltaic power generation equipment through a piercing gasket.

Preferably, a waterproof terminal for the aluminum wire to pass through is provided at the position of the aluminum wire through hole.

Preferably, the wiring device of photovoltaic equipment has multiple copper-aluminum transition rows, and the multiple copper-aluminum transition rows are successively arranged in rows, and the same copper-aluminum transition row is fixed on the insulating holder through an insulating baffle.

Preferably, an open window is provided on a side of the transition box directly opposite to a terminal of the multiple copper-aluminum transition rows, and the edge of the open window is circumferentially arranged with a second sealing strip, and the open window is sealed by a window baffle connected with the transition box.

Preferably, the wiring device of photovoltaic equipment further includes a male connector and a female connector connected with the male connector by a buckle; and, the copper-aluminum transition piece further includes a first copper-aluminum transition tube, a copper pin, and a first copper tube, and the first copper tube has one end connected to the first copper-aluminum transition tube, and has the other end plugged and electrically connected to the copper pin. The copper pin is fixedly connected in an inner cavity of the housing of the female connector, and the first copper tube is fixedly connected to the copper end of the copper-aluminum transition piece. The outer circumference of the first copper-aluminum transition tube is fixed with the inner cavity of the housing of the male connector.

Preferably, the aluminum end of the first copper-aluminum transition tube has a tubular structure, and the copper end has a rod-shaped structure. The copper end is inserted into the first copper tube, and a blind hole in the middle of the aluminum end is configured to receive the aluminum wire.

Preferably, the wiring device of photovoltaic equipment further includes an elastic sealing gasket arranged in the male connector or the female connector. When the male connector and the female connector are clamped by the buckle, the elastic sealing gasket is squeezed to lock the male connector and the female connector; and, a rubber ring is arranged on the male connector away from the through hole of the female connector, and the rubber ring is in interference fit with the outer skin of aluminum wire.

Preferably, the wiring device of photovoltaic equipment further includes a base, the copper-aluminum transition piece is a second copper-aluminum transition tube, and the second copper-aluminum transition tube includes a second copper tube arranged in a blind hole structure and an aluminum tube in a blind hole structure. The aluminum wire is inserted into the aluminum tube, and an blind hole end of the second copper tube and an blind hole end of the aluminum tube are fixedly connected. An interior of the base is provided with a mounting hole for installing the second copper-aluminum transition tube.

Preferably, the second copper tube is fixed by crimping with the copper tube for inserting into the blind hole and/or fixed by crimping with the aluminum tube for inserting into the blind hole.

Preferably, the side wall of the aluminum tube is threadedly connected with a locking member for pressing the aluminum wire.

Preferably, the blind hole of the aluminum tube is provided with conductive paste for conducting the aluminum tube and the aluminum wire.

Preferably, the wiring device of photovoltaic equipment further includes a protective shell covered outside the copper end of the base and/or the aluminum end of the base, the protective shell is provided with a cable through hole for cable to pass through, and the protective shell is detachably connected with the base.

Preferably, the protective shell is threadedly connected with the base and a sealing strip is provided at the threaded connection position.

Preferably, the wiring device of photovoltaic equipment further includes a clamping nut and a sealing body sleeved on the outside of the cable with an interference fit. The sealing body is arranged in the protective shell, and the clamping nut is threadedly connected with the outside of the protective shell, and is configured to compress the sealing body.

Preferably, an outside wall of the base is provided with an external thread. The wiring device of the photovoltaic equipment further includes a lock nut for locking the base and the case, the lock nut is threadedly connected with the external thread. A sealing strip is connected between the base and the case.

In the above technical solutions, the wiring device of the photovoltaic equipment provided by the present application includes the aluminum wire and the copper-aluminum transition piece, one end of the aluminum wire is connected to the aluminum end of the copper-aluminum transition piece, and the other end of the aluminum wire is configured to connect to the external connecting component, and the cooper end of the cooper-aluminum transition is configured to connect with the photovoltaic power generation equipment.

It can be seen from the above description that in the wiring device of photovoltaic equipment provided by the present application, the copper-aluminum transition piece is arranged at the position of the photovoltaic power generation equipment, and the aluminum end of the copper-aluminum transition piece is able to be connected to the external connecting component by the aluminum wire, avoiding using copper wire for a long-distance conduction, further, the cost of the aluminum wire is much lower than that of the copper wire. Therefore, the cost of the wiring device provided by the application is reduced.

BRIEF DESCRIPTION OF THE DRAWINGS

For more clearly illustrating embodiments of the present application or the technical solutions in the conventional technology, drawings to be used in the description of the embodiments or the conventional technology will be briefly described hereinafter. Apparently, the drawings in the following description are only some embodiments of the present application. For those skilled in the art, other drawings may be obtained based on the provided drawings without any creative work.

in FIGS. 1-4:
1. case;
2. transition box; 2-1. insulating holder; 2-2. insulating baffle; 2-3. second sealing strip; 2-4. copper wire through holes; 2-5. aluminum wire through holes; 2-6. first sealing strip; 2-7. limiting protrusion;
3. copper-aluminum transition piece; 3-1. copper piece; 3-2. aluminum piece; 3-3. first copper-aluminum transition tube; 3-4. first copper tube; 3-5. copper pin; 3-6. second copper-aluminum transition tube; 3-6-1. second copper tube; 3-6-2 aluminum tube;
4. waterproof terminal;
5. male connector; 5-1. buckle;
6. female connector; 6-1. case slot;
7. base;
8. protective shell;
9. locking member.

DETAILED DESCRIPTION OF THE EMBODIMENTS

A wiring device of photovoltaic equipment is provided by the present application for reducing the cost of the wiring device.

In order to enable those skilled in the art to better understand the technical solutions of the present application, the present application will be further described in detail below with reference to the drawings and embodiments.

Reference is made to FIG. 1 to FIG. 4.

In a specific embodiment, a wiring device of photovoltaic equipment provided by the present application includes an aluminum wire and a copper-aluminum transition piece 3, and one end of the aluminum wire is connected to an aluminum end of the copper-aluminum transition piece 3, and the other end of the aluminum wire is connected to an external connecting component, and a cooper end of the cooper-aluminum transition 3 is connected with photovoltaic power equipment. The aluminum wire as an input cable may be an aluminum cable leading from the component.

It can be seen from the above description that in the wiring device of photovoltaic equipment provided in the specific embodiment of the present application, the copper-aluminum transition piece 3 is arranged at the position of the photovoltaic power generation equipment, and the aluminum end of the copper-aluminum transition piece 3 may be connected to the external connecting component by the aluminum wire, avoiding using copper wire for a long-distance conduction. Further, the cost of the aluminum wire is much lower than that of the copper wire. Therefore, the cost of the wiring device provided by the application is reduced.

Figure 1:
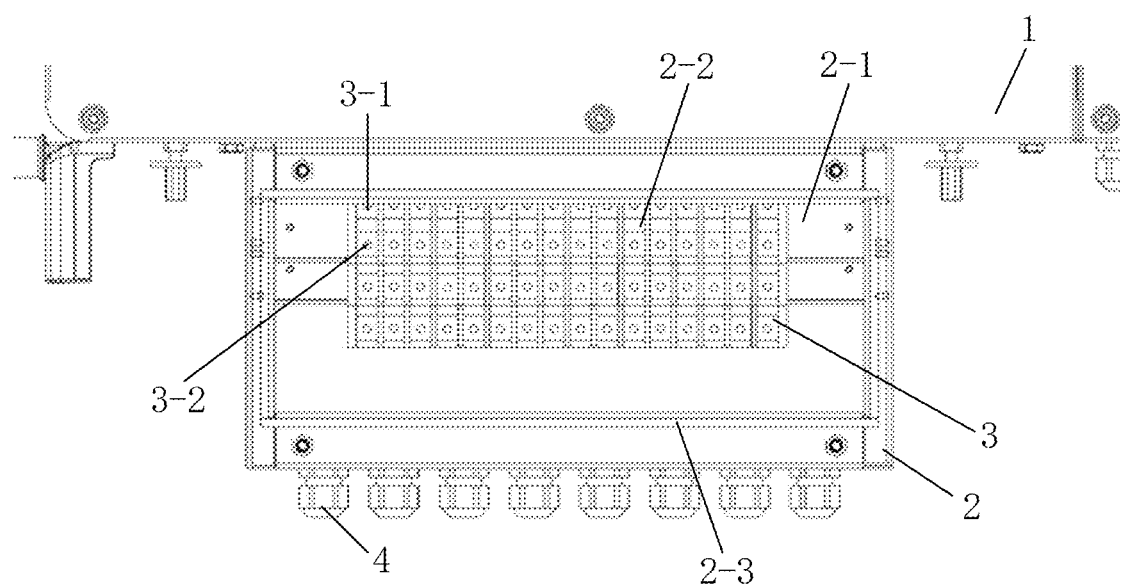
FIG. 1 is a schematic structural diagram of a first wiring device of photovoltaic equipment provided by an embodiment of the present application.
Figure 2:
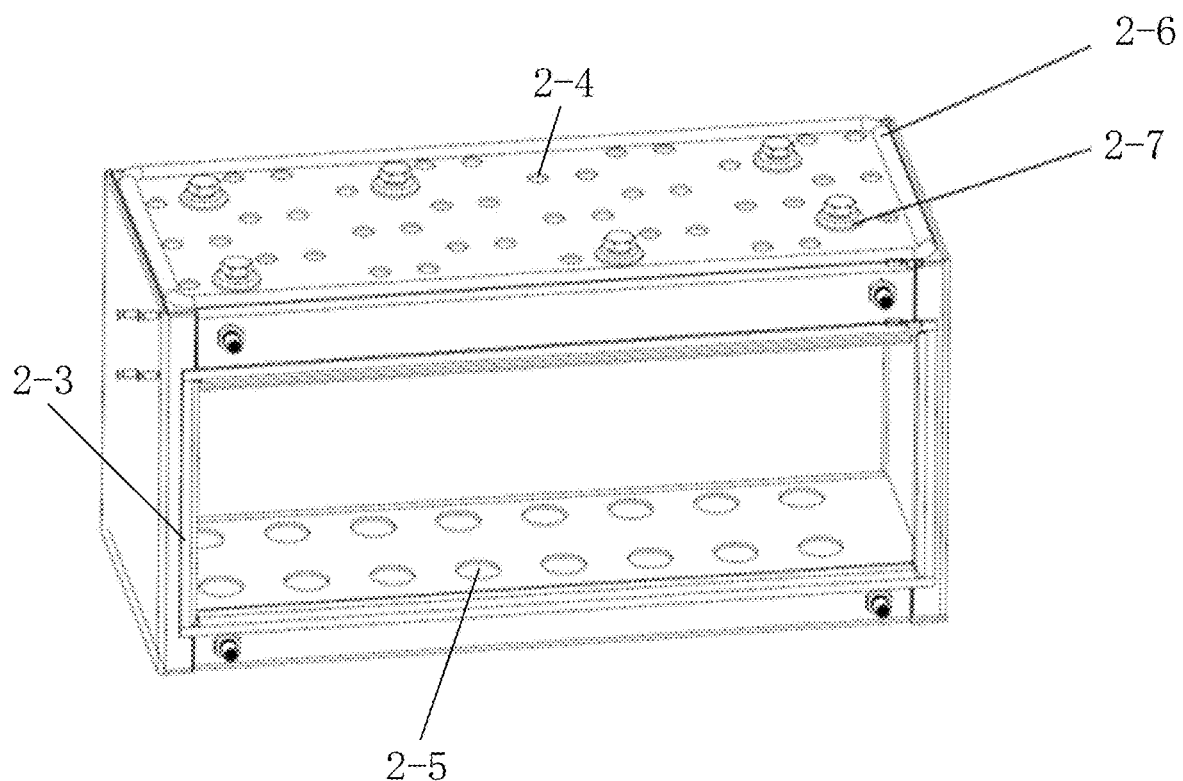
FIG. 2 is a schematic structural diagram of a first type of transition box provided by an embodiment of the present application.

As shown in FIGS. 1 and 2, in a specific embodiment, the wiring device of photovoltaic equipment further includes a transition box 2, and the copper-aluminum transition piece 3 is a copper-aluminum transition row. An insulating holder 2-1 for installing the copper-aluminum transition row is provided in an interior of the transition box 2, and a housing of the transition box 2 is provided with multiple copper wire through holes 2-4 for the passage of the copper wires and multiple aluminum wire through holes 2-5 for the passage of the aluminum wires. Specifically, the transition box 2 may be arranged under an inverter of the case 1, and the inverter and the transition box 2 may be integrated as a whole or the transition box 2 may be used independently without the inverter. During field wiring, the aluminum cable of a PV module enters the transition box 2 and is connected to the aluminum end at a lower end of the copper-aluminum transition row through an aluminum OT terminal. The copper wire on the case 1 enters the transition box 2 and is connected to a copper end of the copper-aluminum transition row.

Specifically, the copper wire through holes 2-4 corresponds to original wire inlet holes of the case 1 one-to-one, which facilitates a smooth connection of the case 1 and terminals of the transition box 2.

The connection between the transition box 2 and the case 1 is preferably a repeatable connection, including but not limited to bolts, buckles, and the like.

One end of the copper-aluminum transition row is a copper piece 3-1 connected to a main body of the case 1, and the other end of the copper-aluminum transition row is an aluminum piece 3-2 connected to an input terminal and further connected to the aluminum wires. Two ends of the copper piece 3-1 and the aluminum piece 3-2 are connected by friction welding.

In order to improve the sealing performance, preferably, the copper wire through holes 2-4 are arranged on a first side surface of the transition box 2, and the aluminum wire through holes 2-5 are arranged on a second side surface of the transition box 2, and the first side surface is opposite to the second side surface. As shown in FIG. 1, the first side surface is an upper surface of the transition box 2, and the second side surface is a lower surface of the transition box 2. The outer surface of the first side surface is provided with a limiting protrusion 2-7 capable of cooperating with a case 1 and a first sealing strip 2-6 arranged circumferentially, and an outer protruding length of the limiting protrusion 2-7 is smaller than a free-state outer elongation length of the first sealing strip 2-6. The wiring device of photovoltaic equipment has multiple limiting protrusions 2-7, and multiple limiting protrusions 2-7 are arranged along the circumference of the first sealing strip 2-6, and the copper wire through holes 2-4 are located in an inner space formed by the circumferential encircle of the first sealing strip 2-6. The first side surface is fixedly connected with the photovoltaic power generation equipment. The transition box 2 has the limiting protrusion 2-7 protruding outward, and the first sealing strip 2-6 is pasted around the transition box. The transition box and the main body of the case 1 are fixed together by screws. The limiting protrusion 2-7 plays a limiting role, which allows the sealing strip 2-6 to be compressed to a specific value to achieve sealing. The DC side of the photovoltaic power generation equipment is connected to the aluminum wire, and it is installed with the inverter together to form a high protection level (such as IP65) structure.

In a specific embodiment, the first side surface is connected with the case 1 of the photovoltaic power generation equipment through a piercing gasket. That the connection between the dedicated transition box and the case 1 through the piercing gasket may realize the equipotential connection between the transition box 2 and the main body of the case 1.

In order to improve the sealing performance, preferably, a waterproof terminal 4 for the aluminum wires to pass through is provided at the position of the aluminum wire through holes 2-5. The PV cable enters the transition box 2 and is sealed by gland. For a structure with a high protection level (such as IP65), after the transition box 2 is installed with the inverter of the case 1, it is still a structure with a high protection level (such as IP65). The transition box 2 is configured with the waterproof terminal 4, and the waterproof terminal 4 may allow one or more cables to enter the transition box 2 and achieves sealing.

In a specific embodiment, the wiring device of photovoltaic equipment has multiple copper-aluminum transition rows, and the multiple copper-aluminum transition rows are successively arranged in multiple rows, and the same copper-aluminum transition row is fixed on the insulating holder 2-1 through an insulating baffle 2-2. Specifically, the insulating holder 2-1 is fixedly connected to an inner cavity of the transition box 2. This structure device is able to simultaneously connect multiple strings of cables.

The copper-aluminum transition row may be placed in layers up and down. The insulating baffle 2-2 is fixed to the insulating holder 2-1 by screws, or is fixed to a bracket inside the transition box 2 by a guide rail. Specifically, the insulating baffle 2-2 may be clamped with the guide rail.

In order to facilitate wiring, preferably, an open window is provided on a side of the transition box 2 directly opposite to a terminal of the copper-aluminum transition row, and the edge of the open window is circumferentially provided with a second sealing strip 2-3. The open window is sealed by a window baffle connected with the transition box 2. Preferably, the window baffle is detachably connected to the transition box 2, and when sealing is performed, the outlet baffle abuts against the second sealing strip 2-3.

Figure 3:
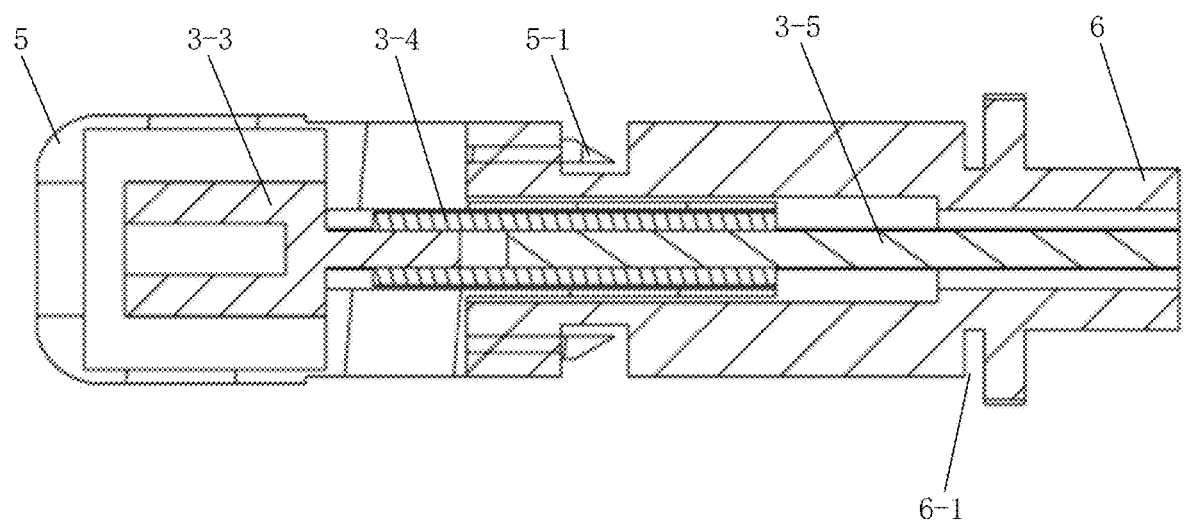
FIG. 3 is a schematic structural diagram of a second wiring device provided by an embodiment of the present application.

As shown in FIG. 3, in another specific embodiment, the wiring device of photovoltaic equipment further includes a male connector 5 and a female connector 6 connected with the male connector 5 by a buckle 5-1. Specifically, the buckle 5-1 may be fixed on the male connector 5, and the buckle 5-1 and the male connector 5 are of an integral structure.

The copper-aluminum transition piece 3 further includes a first copper-aluminum transition tube 3-3, a copper pin 3-5, and a first copper tube 3-4. The first copper tube 3-4 has one end connected to the first copper-aluminum transition tube 3-3, and the other end plugged and electrically connected to the copper pin 3-5. The copper pin 3-5 is fixedly connected in an inner cavity of the housing of the female connector 6, and the first copper tube 3-4 is fixedly connected to the copper end of the copper-aluminum transition piece 3. The outer circumference of the first copper-aluminum transition tube 3-3 is fixed with an inner cavity of the housing of the male connector 5. With this structure, only one string is connected at a time.

The aluminum end of the first copper-aluminum transition tube 3-3 has a tubular structure, and the copper end has a rod-shaped structure. The copper end is inserted into the first copper tube 3-4, and a blind hole in the middle of the aluminum end is configured to insert the aluminum wire. The copper end of the first copper-aluminum transition tube 3-3 is connected to the first copper tube 3-4 by crimping or welding, and the aluminum end is fixed to the aluminum wire by crimping.

The copper end and the aluminum end are connected by friction welding or explosion welding, and there is conductive paste inside the aluminum tube. The first copper-aluminum transition tube 3-3 is composed of two parts. The first half part is crimped with the cable, and this part is made of aluminum or alloy material. The second half part is made of copper, which may be inserted into the terminal structure of the waterproof terminal. When in use, the PV side aluminum wire is crimped with the first half part of the first copper-aluminum transition tube 3-3 into a whole, and the whole is delivered into the plastic of the male connector 5 of the waterproof terminal for fixing. Specifically, the female connector 6 also has a plastic shell structure preferably.

Preferably, the wiring device of photovoltaic equipment provided by the application further includes an elastic sealing gasket arranged in the male connector 5 or the female connector 6. When the male connector 5 and the female connector 6 are clamped by the buckle 5-1, the elastic sealing gasket is squeezed to lock the male connector 5 and the female connector 6. Specifically, the elastic gasket is a sealing strip arranged inside the female connector 6. When the female connector 6 and the male connector 5 are connected by the buckle 5-1, the male connector 5 may squeeze the sealing strip of the female connector 6, which achieves the sealing between the male connector 5 and the female connector 6.

A rubber ring is arranged on the male connector 5 away from the wiring hole of the female connector 6, and the rubber ring is in interference fit with an outer skin of the aluminum wire. The male connector 5 has a rubber ring at the end, and may be pressed tightly by a nut, so as to make the rubber ring and the outer skin of the cable have an interference fit, thereby realizing the waterproof function.

Specifically, the outer circumference of the housing of the female connector 6 is provided with external threads, which are fixed on the case 1 by a nut. There is a sealing strip where the female connector 6 contacts the case 1. When the nut is tightened, the sealing strip is compressed and deformed to achieve sealing.

Alternatively, the female connector may not be installed on the case 1. That is, a rubber ring is arranged on the housing of the male connector 5 away from the through hole of the female connector 6. The rubber ring has an interference fit with the outer skin of the copper wire. The female connector 6 has a rubber ring at the end, and may be pressed tightly by a nut to make the rubber ring and the outer skin of the copper wire cable have an interference fit, thereby realizing the waterproof function and the sealing of the female connector and the copper wire, and realizing the copper wire to be connected to the photovoltaic power generation equipment.

The cable with a small diameter on the string side of the wiring device of photovoltaic equipment may also be switched from copper wires to aluminum wires. The cost of aluminum wires is much lower than that of copper wires, which can greatly reduce material costs.

Figure 4:
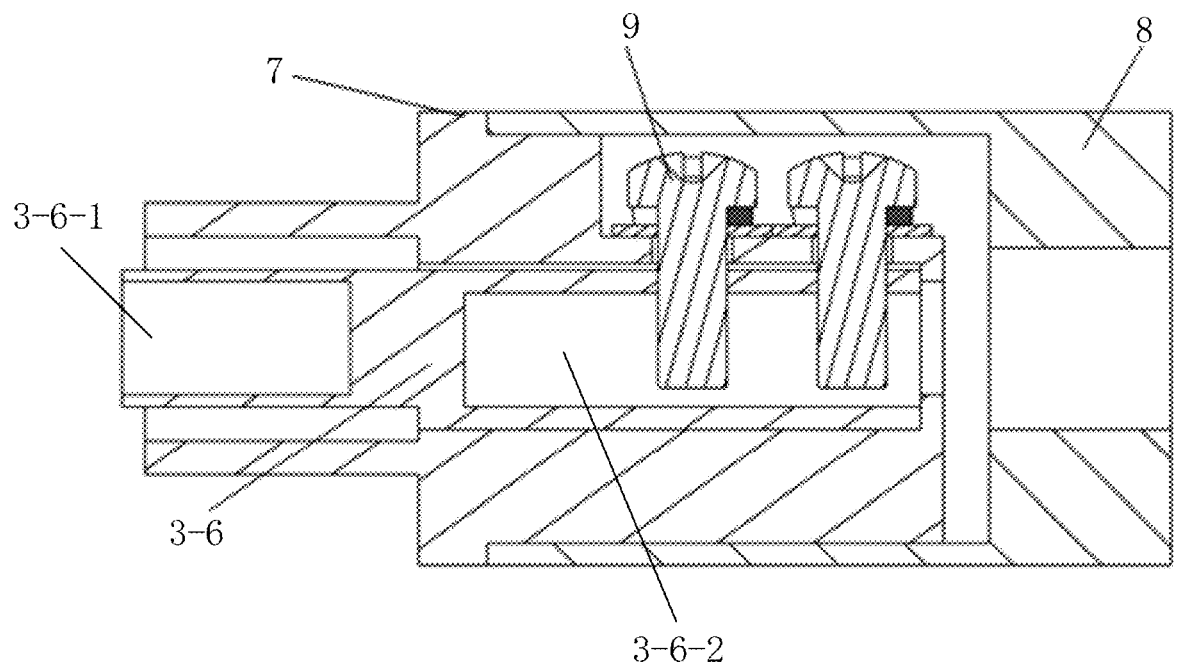
FIG. 4 is a schematic structural diagram of a third wiring device provided by an embodiment of the present application.

As shown in FIG. 4, the wiring device of photovoltaic equipment provided in the present application further includes a base 7, the copper-aluminum transition piece is a second copper-aluminum transition tube 3-6, and the second copper-aluminum transition tube 3-6 includes a second copper tube 3-6-1 arranged in a blind hole structure and an aluminum tube 3-6-2 in a blind hole structure. The aluminum wire is inserted into the aluminum tube 3-6-2, and the blind hole end of the second copper tube 3-6-1 and the blind hole end of the aluminum tube 3-6-2 are fixedly connected, and an interior of the base 7 is provided with a mounting hole for installing the second copper-aluminum transition tube 3-6.

Specifically, the connection manner of the second copper-aluminum transition tube 3-6 with the copper wire and the aluminum wire may be either crimping or fixing with threaded fasteners.

In a specific embodiment, the second copper tube 3-6-1 is fixed by crimping with the copper tube for inserting into the blind hole and/or fixed by crimping with the aluminum tube 3-6-2 for inserting into the blind hole.

In another specific embodiment, the side wall of the aluminum tube 3-6-2 is threadedly connected with a locking member 9 for pressing the aluminum wire. When the aluminum wire is inserted, the locking member 9 is screwed to the position of the aluminum wire to achieve the locking of the aluminum wire.

In order to improve the installation stability of the aluminum wire, preferably, the blind hole of the aluminum tube 3-6-2 is provided with conductive paste for conducting the aluminum tube 3-6-2 and the aluminum wire.

The structure of the second copper tube 3-6-1 may also adopt the structure of the aluminum tube 3-6-2, and the copper wire is fixedly conductive with the second copper tube 3-6-1 by corresponding locking member 9. A thread is also provided in the blind hole of the second copper tube 3-6-1.

In a specific embodiment, the wiring device of photovoltaic equipment further includes a protective shell 8 covered outside the copper end of the base 7 and/or the aluminum end of the base 7, the protective shell 8 is provided with a cable through hole for cable to pass through, and the protective shell 8 is detachably connected with the base 7. Specifically, the protective shell 8 may be connected to the base 7 by a buckle. In order to improve the sealing performance, preferably, the protective shell 8 has internal threads and the base 7 has external threads, and the protective shell 8 and the base 7 are connected and fixed by threaded connection. Preferably, there is a sealing strip between the protective shell 8 and the base 7. When the protective shell 8 is tightened, the sealing strip is compressed to achieve sealing.

The wiring device of photovoltaic equipment further includes a clamping nut and a sealing body sleeved on the outside of the cable with an interference fit, the sealing body is arranged in the protective shell 8, and the clamping nut is threadedly connected with the outside of the protective shell 8, and is configured to compress the sealing body. When the clamping nut is tightened, the sealing body compresses the cable to achieve the clamping of the cable. Specifically, the cable may be an aluminum wire or a copper wire.

Specifically, during assembly, the wire coming from the side of the photovoltaic power generation equipment is connected to the second copper tube 9-1 of the second copper-aluminum transition tube 3-6 by crimping. The aluminum wire coming from the component side is connected to the aluminum 3-6-2 of the copper-aluminum transition tube. The aluminum wire 3-6-2 has threaded holes, and the aluminum wire is pressed by the locking member 9.

When the base 7 is not mounted on the case, a suspending form is adopted. At this time, preferably, the outside of the copper end of the base 7 and the outside of the aluminum end of the base 7 are provided with the protective shell 8.

When the wiring device of the photovoltaic equipment is directly installed on the case of the photovoltaic power generation equipment, the outside wall of the base 7 is provided with an external thread, and the wiring device of the photovoltaic equipment further includes a lock nut for locking the base 7 and the case, and the lock nut is threadedly connected with the external thread. A sealing strip is connected between the base 7 and the case. When the nut is fixed in place, the sealing strip is compressed to realize the protection between the photovoltaic power generation equipment and the base 7.

The above embodiments are described in a progressive manner. Each of the embodiments is mainly focused on describing its differences from other embodiments, and reference may be made among these embodiments with respect to the same or similar parts.

The above illustration of the disclosed embodiments can enable those skilled in the art to implement or use the present application. Various modifications to the embodiments are apparent to the person skilled in the art, and the general principle herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A wiring device of photovoltaic equipment, comprising:
   an aluminum wire;
   a copper-aluminum transition piece; and
   a transition box;
   wherein one end of the aluminum wire is connected to an aluminum end of the copper-aluminum transition piece, and the other end of the aluminum wire is configured to connect to an external connecting component, and a copper end of the copper-aluminum transition piece is configured to connect with photovoltaic power equipment; and
   wherein the copper-aluminum transition piece is a copper-aluminum transition row, and an insulating holder for installing the copper-aluminum transition row is provided in an interior of the transition box, and a housing of the transition box is provided with a copper wire through hole for the passage of the copper wire and an aluminum wire through hole for the passage of the aluminum wire.

2. The wiring device of the photovoltaic equipment according to claim 1, wherein the copper wire through hole is arranged on a first side surface of the transition box, the aluminum wire through hole is arranged on a second side surface of the transition box, and the first side surface is opposite to the second side surface;
   an outer surface of the first side surface is provided with a limiting protrusion for abutting against a case and a first sealing strip arranged circumferentially, and an outer protruding length of the limiting protrusion is smaller than a free-state outer elongation length of the first sealing strip; and
   a plurality of limiting protrusions is provided, and the plurality of limiting protrusions is arranged along the circumference of the first sealing strip, and the copper wire through hole is located in an inner space formed by a circumferential encircle of the first sealing strip, and the first side surface is fixedly connected with photovoltaic power equipment.

3. The wiring device of the photovoltaic equipment according to claim 2, wherein the first side surface is connected with a case of the photovoltaic power equipment through a piercing gasket.

4. The wiring device of the photovoltaic equipment according to claim 2, wherein a waterproof terminal for the aluminum wire to pass through is provided at the position of the aluminum wire through hole.

5. The wiring device of the photovoltaic equipment according to claim 1, comprising a plurality of copper-aluminum transition rows, wherein the plurality of copper-aluminum transition rows is successively arranged in rows, and the same copper-aluminum transition row is fixed on the insulating holder through an insulating baffle.

6. The wiring device of the photovoltaic equipment according to claim 5, wherein an open window is provided on a side of the transition box directly opposite to a terminal of the plurality of copper-aluminum transition rows, and an edge of the open window is circumferentially provided with a second sealing strip, and the open window is sealed by a window baffle connected with the transition box.

7. A wiring device of photovoltaic equipment, comprising:
   an aluminum wire;
   a copper-aluminum transition piece;
   a male connector; and
   a female connector connected with the male connector by a buckle;
   wherein one end of the aluminum wire is connected to an aluminum end of the copper-aluminum transition piece, and the other end of the aluminum wire is configured to connect to an external connecting component, and a copper end of the copper-aluminum transition piece is configured to connect with photovoltaic power equipment; and
   wherein the copper-aluminum transition piece further comprises a first copper-aluminum transition tube, a copper pin, and a first copper tube, and the first copper tube has one end connected to the first copper-aluminum transition tube and has the other end plugged and electrically connected to the copper pin, and the copper pin is fixedly connected in an inner cavity of a housing of the female connector, and the first copper tube is fixedly connected to the copper end of the copper-aluminum transition piece, and an outer circumference of the first copper-aluminum transition tube is fixed with an inner cavity of a housing of the male connector.

8. The wiring device of photovoltaic equipment according to claim 7, wherein the aluminum end of the first copper-aluminum transition tube has a tubular structure, and the copper end has a rod-shaped structure, and the copper end is inserted into the first copper tube, and a blind hole in the middle of the aluminum end is configured to receive the aluminum wire.

9. The wiring device of photovoltaic equipment according to claim 7, further comprising an elastic sealing gasket arranged in the male connector or the female connector, wherein when the male connector and the female connector are clamped by the buckle, the elastic sealing gasket is squeezed to lock the male connector and the female connector; and
   a rubber ring is arranged on the male connector away from a wiring hole of the female connector, and the rubber ring is in interference fit with an outer skin of the aluminum wire.

10. A wiring device of photovoltaic equipment, comprising:
    an aluminum wire,
    a copper-aluminum transition piece, and
    a base, wherein one end of the aluminum wire is connected to an aluminum end of the copper-aluminum transition piece, and the other end of the aluminum wire is configured to connect to an external connecting component, and a copper end of the copper-aluminum transition piece is configured to connect with photovoltaic power equipment; and wherein the copper-aluminum transition piece is a second copper-aluminum transition tube, and the second copper-aluminum transition tube comprises a second copper tube defined as a blind hole and an aluminum tube defined as a blind hole, and the aluminum wire is inserted into the aluminum tube, and a blind hole end of the second copper tube and a blind hole end of the aluminum tube are fixedly connected, and an interior of the base is provided with a mounting hole for installing the second copper-aluminum transition tube.

11. The wiring device of photovoltaic equipment according to claim 10, wherein the second copper tube is fixed by crimping with the second copper tube for inserting into the blind hole and/or fixed by crimping with the aluminum tube for inserting into the blind hole.

12. The wiring device of photovoltaic equipment according to claim 10, wherein a side wall of the aluminum tube is threadedly connected with a locking member for pressing the aluminum wire.

13. The wiring device of photovoltaic equipment according to claim 12, a blind hole of the aluminum tube is provided with conductive paste for conducting the aluminum tube and the aluminum wire.

14. The wiring device of photovoltaic equipment according to claim 10, further comprising a protective shell covered an outside of the copper end of the base and/or the aluminum end of the base, wherein the protective shell is provided with a cable through hole for cable to pass through, and the protective shell is detachably connected with the base.

15. The wiring device of photovoltaic equipment according to claim 14, wherein the protective shell is threadedly connected with the base and a sealing strip is provided at a threaded connection position.

16. The wiring device of photovoltaic equipment according to claim 14, further comprising a clamping nut and a sealing body sleeved on an outside of the cable with an interference fit, wherein the sealing body is arranged in the protective shell, and the clamping nut is threadedly connected with an outside of the protective shell, and is configured to compress the sealing body.

17. The wiring device of photovoltaic equipment according to claim 14, wherein an outside wall of the base is provided with an external thread, and the wiring device of photovoltaic equipment further comprises a lock nut for locking the base and a case, the lock nut is threadedly connected with the external thread, and a sealing strip is connected between the base and the case.

* * * * *